US008743760B2

(12) United States Patent
Hwang et al.

(10) Patent No.: US 8,743,760 B2
(45) Date of Patent: Jun. 3, 2014

(54) METHOD AND APPARATUS UTILIZING PROTOCOLS

(75) Inventors: Woonhee Hwang, Espoo (FI); Roman Pichna, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 194 days.

(21) Appl. No.: 13/381,479

(22) PCT Filed: Jun. 29, 2009

(86) PCT No.: PCT/EP2009/058132
§ 371 (c)(1),
(2), (4) Date: Mar. 19, 2012

(87) PCT Pub. No.: WO2011/000406
PCT Pub. Date: Jan. 6, 2011

(65) Prior Publication Data
US 2012/0207078 A1 Aug. 16, 2012

(51) Int. Cl.
*H04B 7/00* (2006.01)
(52) U.S. Cl.
USPC .................................... 370/310.2; 370/349
(58) Field of Classification Search
USPC ............... 370/400, 401, 310.2, 328, 338, 349
See application file for complete search history.

(56) References Cited

U.S. PATENT DOCUMENTS

| | | | | |
|---|---|---|---|---|
| 8,451,795 | B2 * | 5/2013 | Ho et al. ........................ | 370/331 |
| 2009/0264077 | A1 * | 10/2009 | Damnjanovic ............... | 455/63.1 |
| 2010/0296448 | A1 * | 11/2010 | Vainikka et al. .............. | 370/328 |
| 2012/0063417 | A1 * | 3/2012 | Redana et al. ................ | 370/331 |
| 2012/0087276 | A1 * | 4/2012 | Huang et al. .................. | 370/253 |

OTHER PUBLICATIONS

3GPP TR 36.814 V0.4.1 (Feb. 2009), "3$^{rd}$ Generation partnership Project; Technical Specification Group Radio Access network; further Advancements for E-UTRA Physical Layer Aspects (Release 9)", 31 pgs.
3GPP TS 36.423 V8.6.0 (Jun. 2009), "3$^{rd}$ Generation Partnership Project; Technical Specification Group Radio Access Network; Evolved Universal Terrestrial Radio Access network (E-UTRAN); X2 Application Protocol (X2AP) (Release 8)", 100 pgs.
R2-092407, 3GPP TSG-RAN WG2 Meeting #65bis, Mar. 23-27, 2009, Seoul, Korea, CMCC, "Discussions on Functionality Partition of Relay in RAN2", 4 pgs.
R2-092989, 3GPP TSG RAN WG2 Meeting #66, San Francisco, US, May 4-8, 2009, CATT, "Consideration of Type 1 Relay Protocol Stack for RAN2", 3 pgs.
R2-093972, 3GPP TSG-RAN WG2 #66bis, Jun. 29-Jul. 3, 2009, NTT Docomo, Inc., "Report of E-mail Discussion 66#22 on Relay Architecture", 30 pgs.
R3-091228, 3GPP TSG-RAN3#64, May 4-8, 2009, San Francisco, USA, NTT Docomo, "Relay Requirements & Use Case Study in LTE-Advanced", 5 pgs.

(Continued)

Primary Examiner — Brenda H Pham
(74) Attorney, Agent, or Firm — Harrington & Smith

(57) ABSTRACT

A method including receiving data in at least one link layer message from a first access node at a second access node, the first access node being associated with the second node; determining if said data is to be sent to a third access node; and, sending the data in at least one internet protocol message to the third access node. The first access node may be a relay node.

28 Claims, 7 Drawing Sheets

(56) References Cited

OTHER PUBLICATIONS

3GPP TR 36.913 V8.0.1 (Mar. 2009), "3$^{rd}$ Generation Partnership Project; Technical Specification Group Radio Access network; Requirements for further advancements for Evolved Universal Terrestrial Radio Access (E-UTRA) (LTE-Advanced) (Release 8)", 15 pgs.

3GPP TS 36.321 V8.6.0 (Jun. 2009), "3$^{rd}$ Generation Partnership Project; Technical specification Group Radio Access Network; Evolved Universal Terrestrial Radio Access (E-UTRA) Medium Access Control (MAC) protocol specification (Release 8)", 47 pgs.

\* cited by examiner

METHOD AND APPARATUS UTILIZING PROTOCOLS

Embodiments of the invention relate to a method and apparatus which use protocols and has particular, but not exclusive, application to communication systems which include relay nodes.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system at least a part of the communication between at least two stations occurs over a wireless link. Examples of wireless systems include public land mobile networks (PLMN), satellite based communication systems and different wireless local networks, for example wireless local area networks (WLAN). The coverage of wireless systems can be divided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems a communication devices provides a transceiver station that can communicate with e.g. a base station of an access network servicing at least one cell and/or another communications device. Depending on the context, a communication device or user equipment may also be considered as being a part of a communication system. In certain applications, for example in ad-hoc networks, the communication system can be based on use of a plurality of user equipment capable of communicating with each other.

The communication may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. The user may also be provided broadcast or multicast content. Non-limiting examples of the content include downloads, television and radio programs, videos, advertisements, various alerts and other information.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rates and lower latency with reduced cost. The various development stages of the 3GPP LTE specifications are referred to as releases.

Since the new spectrum bands for international mobile telecommunications (IMT) contain higher frequency bands and LTE-Advanced is aiming at a higher data rate, coverage of one Node B (base station) can be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the User Equipment (UE). This may lead to long battery life, enhanced cell capacity and effective throughput, e.g., increasing cell-edge capacity, balancing cell load, enhancing overall performance, and reducing deployment costs of radio access networks (RAN). The relaying would be provided by entities referred to as Relay stations (RSs) or Relay Nodes (RNs). The relay nodes can be fixed or mobile, for example mounted to a high-speed train. In some systems the relay stations may be opportunistically available user equipment/mobile terminals that are not owned by the network itself.

According to one embodiment there is provided a method comprising: receiving data in at least one link layer message from a first access node at a second access node, said first access node being associated with the second node; determining if said data is to be sent to a third access node; and, sending the data in at least one internet protocol message to the third access node.

The first access node may be a relay node and/or and the second access node is may be a base station.

The first access node and second access node may be part of the same sub-network.

The interface between the second access node and third access node may be a X2 type interface and/or the said internet protocol message may be an X2 type message.

According to another embodiment, there is provided a method comprising: receiving data in at least one internet protocol message at a first base station from a second base station; determining if said data is to be sent to a node associated with the first base station; and sending the data in at least one link layer message to a node.

The node may be a relay node.

The interface between the first base station and second base station may be a an X2 type interface and/or the said internet protocol message may be an X2 type message.

According to another embodiment there is provided a computer program comprising program code means adapted to perform the method of embodiments when the program is run on a processor and a computer readable medium comprising a such computer programs.

According to another embodiment there is provided an access node or processor therefor, having means to receive data in at least one link layer message from a second access node associated with said access node; determining if said data is to be sent to a third access node; and sending the data in at least one Internet protocol message to the third access node.

The access node may be a base station and/or said second access node may be a relay node.

The access node may be part of the same sub-network as the second access node.

The interface between the access node and third access node may be an X2 type interface and/or the said Internet protocol message may be an X2 type message.

According to another embodiment there is provided a base station or processor therefor, having: means to receive data in at least one Internet protocol message from a second base station; and means to determine if said data is to be sent to a node associated with the first base station; and means to send the data in at least one link layer message to a node.

The node may be a relay node.

The interface between the base station and second base station may be an X2 type interface and/or the said Internet protocol message may be an X2 type message.

The link layer may be a Medium Access Control layer.

The link layer message may include routing information. The routing information may comprise one or more of global cell or node identity information. The routing information may include parameters to enable flow separation in the user plane. The routing information may include Tunnel End Point Identifier parameters.

The link layer message may include a modified X2-AP or Protocol Data Unit layer of an X2 type message.

For a better understanding of some embodiments of the invention, reference will be made by way of example only to the accompanying drawings in which.

As specified in 3GPP TR 36.814 (Third Generation Partnership Project) relaying is considered as one of the potential techniques for LTE-A where a RN is wirelessly connected to the radio-access network via a donor cell. Some embodiments of the invention are described in the context of the LTE-A proposals. However, other embodiments of the invention can be used in any other scenario which for example requires or uses one or more relays.

Figure 1:
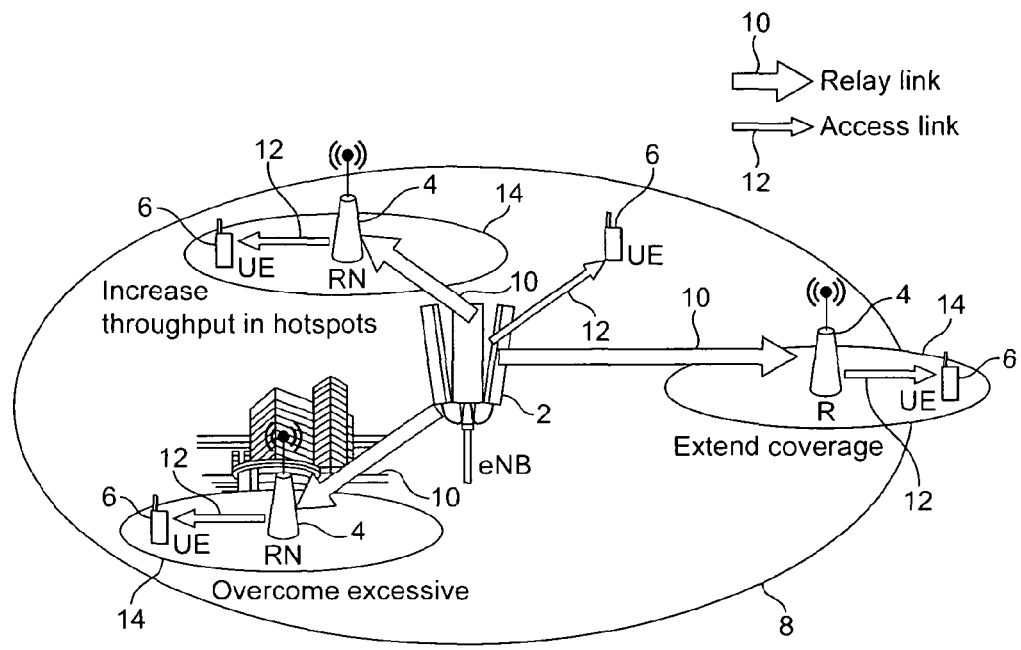
FIG. 1 shows a cell with three relay nodes.

Reference is made to FIG. 1 which shows part of a LTE radio access network (RAN). An access node 2 is provided. The access node can be a base station of a cellular system, a base station of a wireless local area network (WLAN) and/or WiMAX (Worldwide Interoperability for Microwave Access). In certain systems the base station is referred to as Node B, or enhanced Node B (e-NB). For example in LTE-A, the base station is referred to as e-NB. The term base station will be used in the following and is intended to include the use of any of these access nodes or any other suitable access node. The base station 2 has a cell 8 associated therewith. In the cell, there is provided three relay nodes 4. This is by way of example only. In practice there may be more or less than three relay nodes. One of the relay nodes 4 is provided close to the edge of the cell to extend coverage. One of the relay nodes 4 is provided in a traffic hotspot and one of the relay nodes is provided at a location where there is an issue of shadowing from for example buildings. Each of the relay nodes has a coverage area 14 associated therewith. The coverage area may be smaller than the cell 8, of a similar size to the cell or larger than the cell. A relay link 10 is provided between each relay node 4 and the base station 2. The cell has user equipment 6. The user equipment is able to communicate directly with the base station 2 or with the base station 2 via a respective relay node 4 depending on the location of the user equipment 6. In particular, if the user equipment 6 is in the coverage area associated with a relay node, the user equipment may communicate with the relay. The connections between the user equipment and the relay node and the direct connections between the user equipment and the base station are referenced 12.

The UE or any other suitable communication device can be used for accessing various services and/or applications provided via a communication system. In wireless or mobile communication systems the access is provided via an access interface between mobile communication devices (UE) 6 and an appropriate wireless access system. The UE 6 can typically access wirelessly a communication system via at least one base station. The communication devices can access the communication system based on various access techniques, such as code division multiple access (CDMA), or wideband CDMA (WCDMA), the latter technique being used by communication systems based on the third Generation Partnership Project (3GPP) specifications. Other examples include time division multiple access (TDMA), frequency division multiple access (FDMA), space division multiple access (SDMA) and so on. In a wireless system a network entity such as a base station provides an access node for communication devices.

Each UE may have one or more radio channels open at the same time and may receive signals from more than one base station and/or other communication device.

In certain applications, L3 or higher layer relay nodes may be used. L3 is layer 3 of the OSI model and is responsible for source to destination data delivery including routing. Such a relay node may be similar to a base station. In a L3 relay the RN is assumed to have a scheduling capability for the access links of the UEs which are registered to that relay node.

In some applications, there may be an issue of backwards compatibility for earlier versions of the standard. For example in one embodiment, from UE's viewpoint, the serving network node should serve Release 8 (of the 3GPP standard) user equipment. Due to this requirement the relays may support at least some and in some embodiments all of the main eNB functions.

In some applications, a system using relays may be arranged such that at most two hops are allowed in the system (e.g. eNB-UE or eNB-RN-UE) and in other applications of relay systems, there may be more than two hops where for example, relays are able to communicate with each other.

There are currently four potential candidate architectures proposed in 3GPP RAN2 WG. In type 1 architecture, the Relay Node is viewed as an eNB by the UE. A "type 1" RN has been proposed, which is an in-band relaying node having a separate physical cell ID (identity), support of HARQ (Hybrid Automatic Repeat Request) feedback and backward compatibility to Release 8 (Rel 8) UEs.

It has been proposed that the X2 interface should be supported by the Relay Node. The X2 interface is the direct connection between two eNBs and allows information such as load information or the like to be exchanged.

Figure 2:
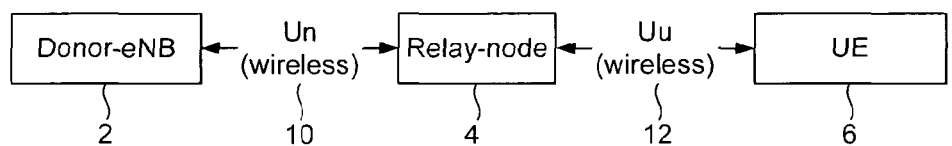
FIG. 2 shows the interfaces between a relay node, a base station and a UE.

In a RAN2 #65bis meeting part of 3GPP, RAN 2 agreed with the definition for the nodes and the interfaces as shown generally in FIG. 2. The wireless interface 12 between UE 6 and RN is named the Uu interface. For those embodiments where backward compatibility is desirable for example where compliance with a particular version of 3GPP standards TR 36.913 and TR36.321 is provided, the interface of the Uu link would be consistent with the Release 8 interface as defined in LTE.

The wireless interface 10 between the RN 4 and the donor e-NB 2 is the Un link interface. The link may be considered as backhaul link.

The "Load Indication" procedure and message in an X2 interface are defined within the X2 AP specification of 3GPP TR36.423. The X2 interface may be typically used as the interface between two eNBs. The purpose of the Load Indication procedure is to transfer load and interference co-ordination information between intra-frequency neighbouring eNBs. The procedure may use non UE-associated signalling.

Figure 3:
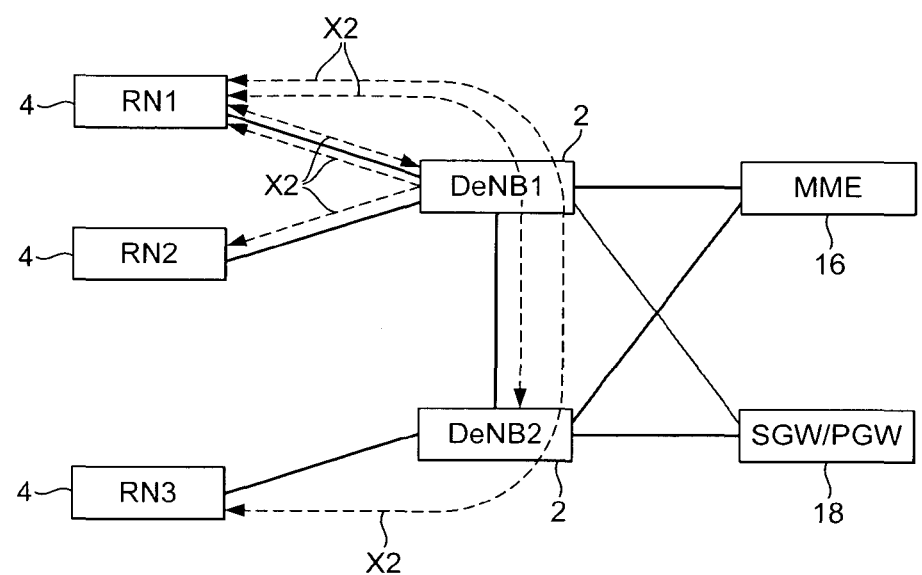
FIG. 3 shows a schematic representation of a portion of a communication system showing a type of architecture.

FIG. 3 shows a schematic representation showing the possible X2 interface connections from a first Relay Node 1 (RN1). There may be two further Relay Nodes RN2 and RN3. There may be several further chained Relay Nodes but they are not all shown. X2 interfaces are shown by dashed lines in the figure. As seen, with respect to RN1, X2 interfaces may be present between RN1 and the donor eNBs as well as between the Relay Nodes themselves via the donor eNBs, DeNB1 and DeNB2—The donor eNBs are connected to both Mobility Management Entity (MME) and a Serving Gateway/Proxy Gateway (SGW/PGW).

Some discussions in 3GPP indicate the use of X2 architecture using a "local breakout" which means using IP-routed transport for X2 already in Un. In the relay node any control or user plane signalling may thus be transported between relay nodes and Donor eNB on top of the IP Layer (Internet Protocol). Such an approach as standardised in 3GPP Rel8, maximises X2 interface similarity between network elements/access nodes (which do not include relay nodes), and also between network elements/access nodes where one or more of these includes a relay node. However this approach includes several layers of additional protocols which serve no purposes between relay nodes and/or between the relays node and other access nodes such as eNBs and Donor eNB and may be at the expense of radio resource efficiency in particular across radio interfaces such as Un. However, it should be appreciated that there may be advantages in this arrangement.

Figure 4:
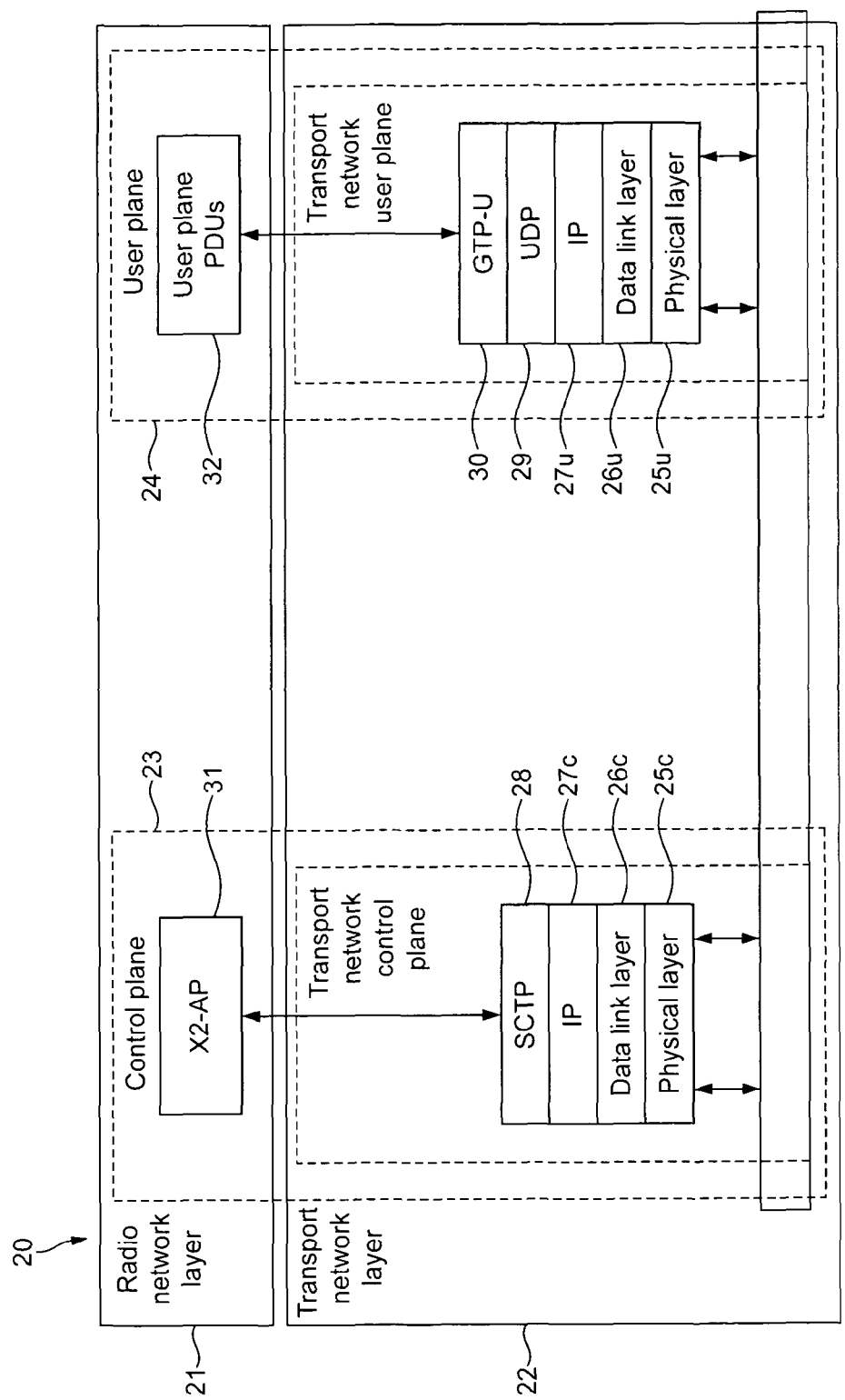
FIG. 4 shows a conventional protocol stack.

FIG. 4 shows the conventional X2 protocol stack 20 that may be used in communication between network elements/access nodes (e.g. base stations/eNBs). It shows the protocol layers for both the Control Plane 23 and the User Plane 24. The stack is further represented as divided, for both of said planes, into a Transport Network Layer 22 and a Radio Network Layer 21.

As far as the control plane is concerned, the Transport Network Layer comprises a stack of (sub-)layers which are the physical layer, 25c, the data link layer 26c, the IP layer 27c and the SCTP (stream control transmission protocol) layer 28. In the Radio Network Layer there is an X2-AP layer 31. In the Transport Network Layer of the User Plane are also physical and data link layers, 25u and 26u respectively, an IP layer 27u and a UDP (User datagram protocol) layer and a GTP-U (GPRS (General Packet radio service) tunneling protocol—for user data) layer. In the Radio Network Layer is a User Plane PDU (Protocol Data Unit) When such a protocol stack as shown is used in systems which include relay nodes (i.e. having relay architecture), any relay node may be regarded as an eNB. The end point IP and SCTP for the control plane of X2 interface may be a relay node or eNB (i.e, RN2 or DeNB1 or DeNB2 or RN3 or any eNB). Also UDP and GTP-U layer end points for the user plane will be the same as in the control plane.

This approach, as mentioned, may create a lot of unnecessary overhead over the interface for the Un link (i.e between eNBs and relay nodes). IP or SCTP layers for the protocols Un interface may not be needed. IP layers are only needed between access nodes such as DeNB1 and DeNB2 to route the packets. As Un link may be a peer-to-peer interface over radio, the use of SCTP and IP may waste radio resource unnecessarily.

Also to use the existing protocol, local break out from RN creates complexity for the RN and donor eNB. This is because the RN has to implement IP stack including its configuration functionality and donor eNB has to provide IP routing functionality and support routing protocols.

In some embodiments of the invention, a simplified protocol stack may be used for communication between relay nodes and access nodes and/or between relay nodes; i.e. over the X2/Un interface. In some embodiments there may be a reduced protocol stack in which there may be less layers (or sub-layers) in the protocol stack.

In one embodiment, such a modified protocol is used where the SCTP and IP layers are removed from the protocol stack. In one embodiment simplified routing information is instead incorporated into the modified X2-Application protocol. In one embodiment this routing information may take the form of global cell identifier (ID) of the source and target eNBs. In an embodiment such information may be added in the X2-AP (AP is Application Protocol) layer (message header) to help the (X2) message routing. Thus in certain embodiments the X2-AP layer message is modified.

Figure 5:
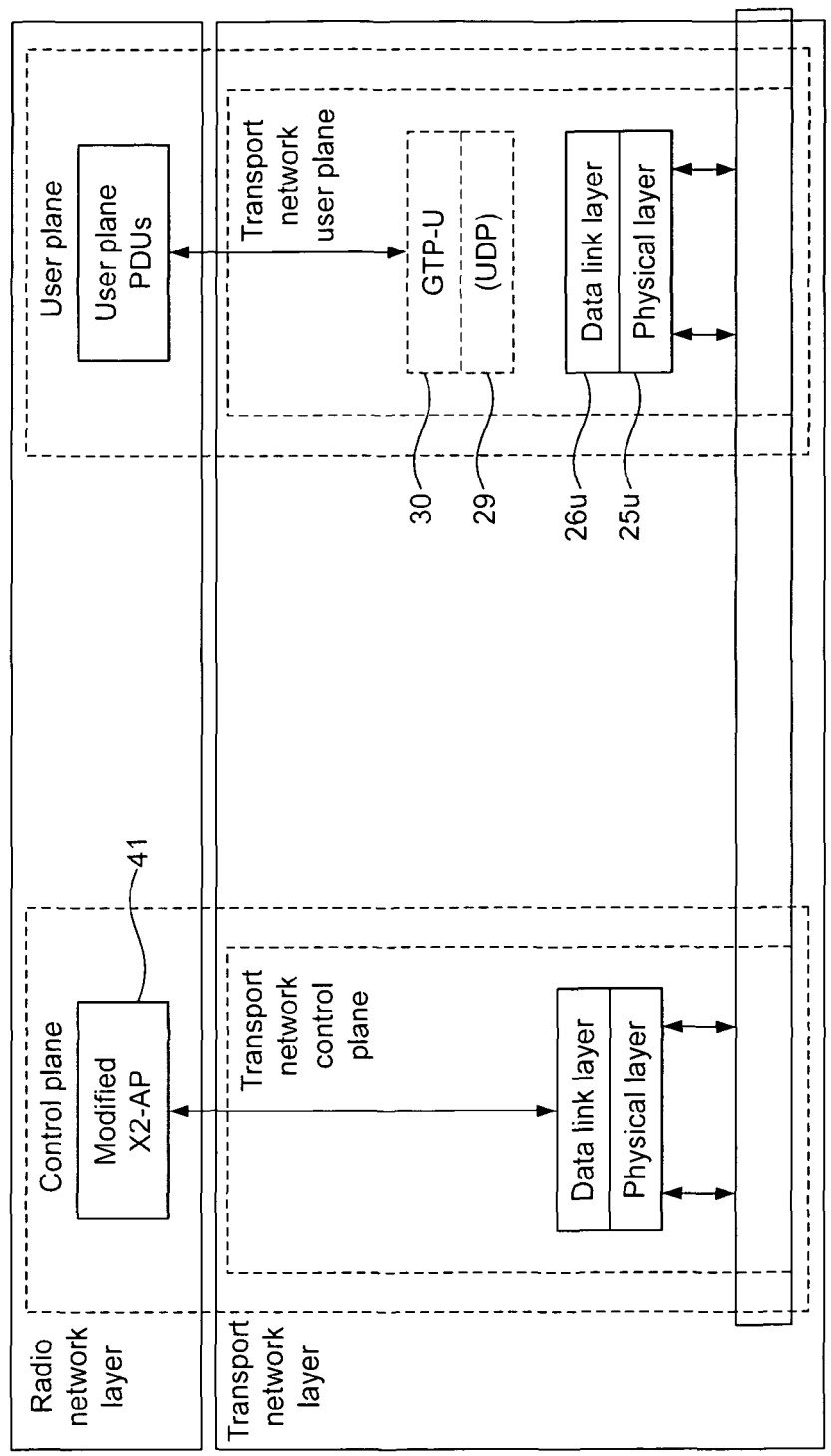
FIG. 5 shows a modified protocol stack which may be used in some embodiments.

FIG. 5 shows an example of a simplified protocol stack which may be utilised according to one embodiment of the invention. In contrast to FIG. 4, in the control plane, the SCTP and/or IP layers in the Transport Network Layer stack in the control plane may be removed. Additionally the X2-AP layer in the Radio Network Layer may be a modified X2-AP layer 41, which allows routing information/parameter(s) to be utilised such as global cell ID's of the source and/or target nodes/eNBs. In one embodiment of the invention, other routing parameters may be utilised in the modified protocol (e.g. in the X2-AP layer) such a Tunnel End Point Identifier (TEID) or equivalent to enable flow separation in the User Plane across relay X2 interface and/or across Un links.

In addition or alternatively, there may be no IP layer in the Transport Network Layer of the User Plane. Additionally or alternatively the IP layer may be omitted for the User plane, as the IP layer may not be needed over the X2 interface; (e.g. across Un links) and, either GTP-U and UDP layers can be used instead. In a further modification, the UDP layer may be omitted.

Alternatively or additionally, a modified PDU 32 layer may be utilised. In one embodiment this modified PDU layer may have only routing information such as a Tunnel End Point Identifier (TEID) instead of entire GTP-U layer to be used over a Un interface.

Various other options according to other embodiments would be clear to the skilled person.

One feature may be provided in some embodiments there is a reduced number of sub-layer(s) and/or reduced complexity of the protocols used across X2 interfaces (or Un links), than is used between e.g. eNBs or between other access nodes.

Therefore, according to certain embodiments, when communicating between eNBs conventional protocol arrangements, (i.e. conventional protocol stack) may be used. Modified protocol stacks according to some embodiment (such as the FIG. 5 protocol stack) can be utilised in communication between eNBs and relay nodes, or between relay nodes. In one embodiment the unnecessary protocol sub-layers may be removed to achieve this.

As already mentioned, in some embodiments of the invention, appropriate routing parameters may be utilised/added in a modified protocol e.g. in the X2-AP layer. The parameter(s) may be for example in one embodiment Tunnel End Point Identifier (TEID) to enable flow separation in the user plane across relay X2/Un links. As relay nodes are typically connected to only one donor eNB, the relay node may be able to send an (e.g. X2) message or modified (X2) message to donor NB with the correct target cell ID.

Figure 6:
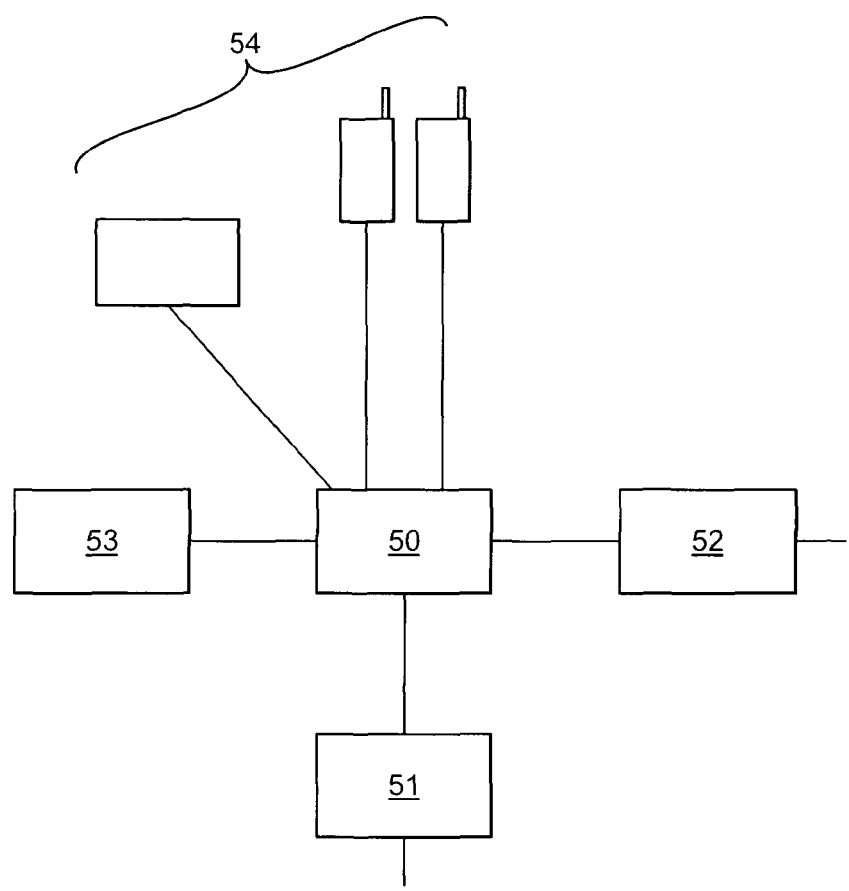
FIG. 6 shows a portion of a communication system illustrating how one embodiment may be implemented.
Figure 7A:
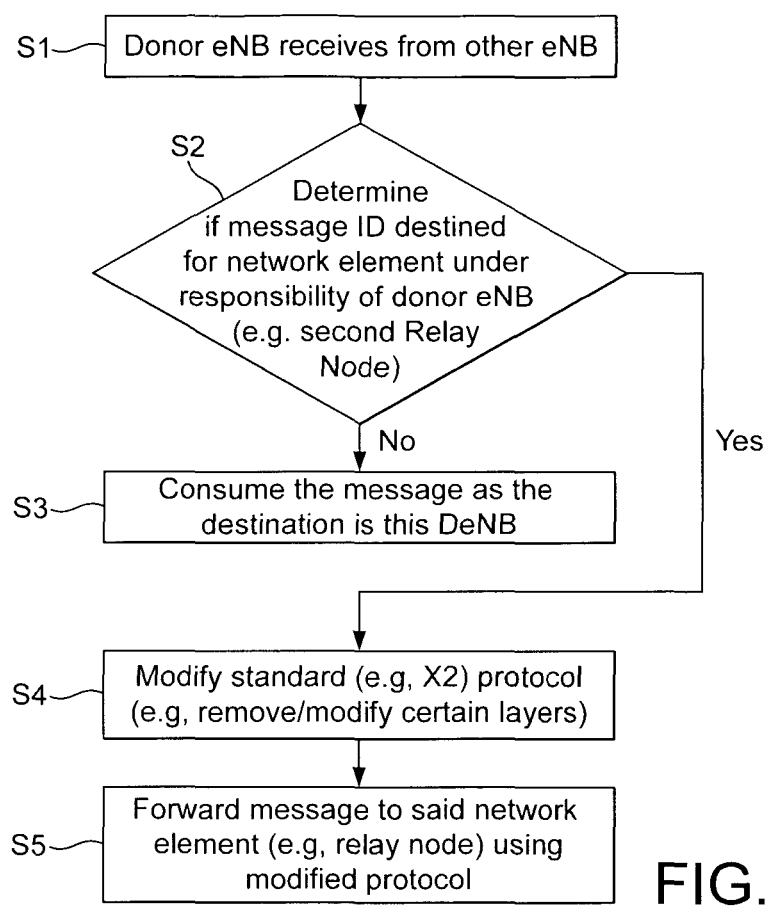
FIGS. 7a and 7b show flow diagrams illustrating certain embodiments.

One embodiment will now be described with reference to FIGS. 6 and 7. FIG. 6 shows an example of portion of a communication system having relay architecture. This is schematic and shows for example how one embodiment may be implemented. There are two (donor) eNBs 50, 51 which are connected to each other. eNB 50 is connected to two relay nodes 52, 53 as well as further User Equipment and/or other further relay nodes, collectively referenced by reference numeral 54. FIGS. 7a and 7b show flow diagrams illustrating embodiments with reference to FIG. 6.

In Step S1, the donor eNB 50 receives a message from another eNB 52. This may be an X2 type message and may include an identity (ID) parameter of the target cell/destination/node.

In Step S2, the donor eNB 50 then decides whether this message is to be routed to a appropriate network element under its own responsibility, such as one or more further relay nodes 53 or user equipment/further node 54, or to a neighbouring eNB 51. This may achieve this by determining if the message ID is destined for a network element under responsibility of the eNB; e.g. relay node 53.

In Step S3, after it is determined that the message has to be sent to a neighbouring eNB instead, such as eNB 51, eNB 50 uses a standard protocol in step S5, (e.g. that which is typically used for X2 interfaces), for forwarding the message. Existing SCTP and IP layers in the protocol stack may be used (e.g. the conventional protocol stack is used). The receiving eNB receives the message as any other X2 message. The message may be "consumed" if it is destined for eNB 50.

If it is determined at step S2 that the message is for a relay node or other node under the responsibility of eNB 50, for example relay node 53, eNB 50 forwards the packet as it is received in Step 4. If the packet is arrived from outside of eNB 50 and contains SCTP and IP. eNB modifies the conventional protocol stack to remove the SCTP and IP. In one embodiment this may include removing SCTP and IP layers. Further modification of one or more remaining layers may be made.

In step S5 the (e.g. X2) message is sent using this modified protocol stack to the appropriate network element e.g. relay node 53. It may be sent based on the Un transport mechanism (Un may have a Medium Access Control (MAC) layer scheduling mechanism to send and receive packets).

Figure 7B:
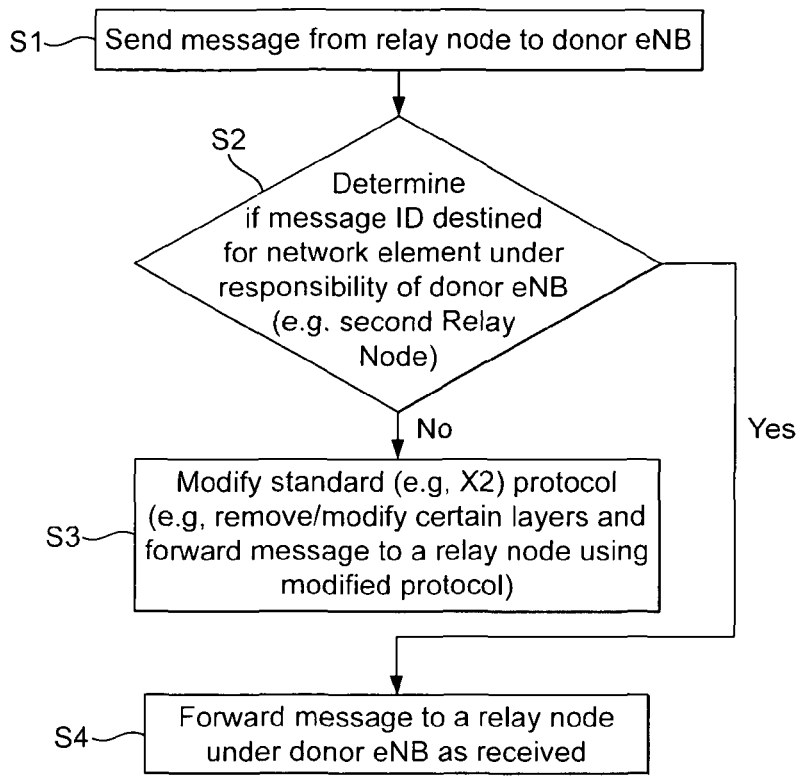

FIG. 7b shows a flow diagram where in step S1 a message is sent from the relay node to an eNB. In step S2 it is determined if the message includes ID information as to whether the message is destined for a network element under responsibility of the donor eNB (e.g. a second relay node). If this is the case the message is forwarded to the appropriate relay node as received as in step S4. If not the protocol is amended and forwarded to the relay node using this modified protocol as in step S3.

As mentioned, in some of the above embodiments, SCTP and/or IP layers may not be required. Because of this reduction in control and associated data, the packets which are transmitted over Un link can be smaller thus saving valuable radio resources. Also as this architecture may not require local break-out which means using IP-routed transport for X2 already in Un. In the donor eNB, it can simplify the donor eNB implementation.

Figure 8:
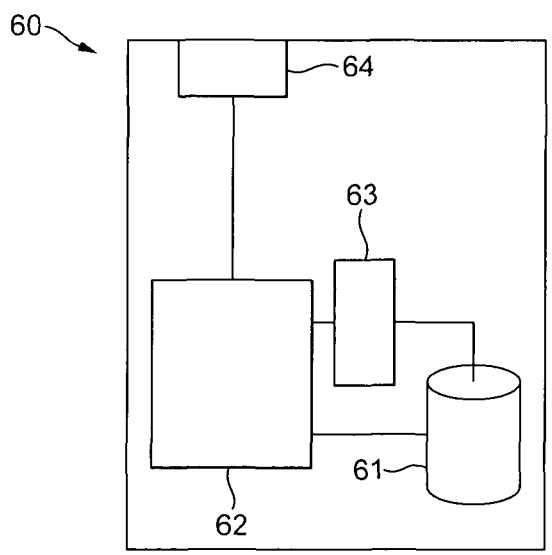
FIG. 8 shows a control apparatus that may be used for elements of certain embodiments.

FIG. 8 shows an example of a control apparatus 60 for a network element such as a base station, eNB, DeNB, relay node or access node. The control apparatus 60 may be configured to implement any of the embodiments. The control apparatus may control, modify and/or determine the protocol in which data is transmitted to, from or via the network element. It may determine which appropriate protocol is to be used to send for example messages, packets or data. It may modify protocols by deleting particular layers from a protocol stack. It may modify one or more layers and asdd routing information. The control apparatus 60 can be configured to execute an appropriate software code to provide the control functions as explained below in more detail. For this purpose the control apparatus comprises at least one memory 61, at least one data processing unit 62, 63 and an input/output interface 64. Via the interface the control apparatus can be coupled to a receiver and a transmitter of the system, for example a base station, access node or relay node antenna, so that it can receive/transmit a transmission from/to the communication device. Control on communications by the communication device can then be based on this determination.

The required data processing apparatus and functions of a relay node and a base station apparatus as well as an appropriate communication device may be provided by means of one or more data processors. The above described functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus associated with the base station, processing apparatus associated with relay node and/or a data processing apparatus associated with a UE. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE, similar principles can be applied to any other communication system where relaying is employed. Therefore, although certain embodiments were described above by way of example with reference to certain exemplifying architectures for wireless networks, technologies and standards, embodiments may be applied to any other suitable forms of communication systems than those illustrated and described herein.

It should be noted that although embodiments of the invention have been described in the context of relative high carrier frequencies, embodiments of the invention can be used with lower frequency carriers.

It is also noted herein that while the above describes exemplifying embodiments of the invention, there are several variations and modifications which may be made to the disclosed solution without departing from the scope of the present invention.

The invention claimed is:

1. A method comprising:
receiving data in at least one link layer message from a first access node at a second access node, said first access node being associated with the second node;
determining if said data is to be sent to a third access node; and,
sending the data in at least one internet protocol message to the third access node.

2. The method of claim 1, wherein said first access node is a relay node or said second access node is a base station, or both said first access node is a relay node and said second access node is a base station.

3. The method of claim 1, wherein said first access node and second access node are part of the same sub-network.

4. The method of claim 1, wherein the interface between the second access node and third access node is an X2 type interface or the said internet protocol message is an X2 type message, or both the interface between the second access node and third access node is an X2 type interface and the said internet protocol message is an X2 type message.

5. The method of claim 1, wherein said link layer is a Medium Access Control layer.

6. The method of claim 1, wherein said link layer message includes routing information.

7. The method of claim 6, wherein said routing information comprises one or more of global cell or node identity information.

8. The method of claim 6, wherein said routing information includes parameters to enable flow separation in the user plane.

9. The method of claim 6, wherein said routing information includes Tunnel End Point Identifier parameters.

10. The method of claim 1, wherein the link layer message includes a modified X2-AP or Protocol Data Unit layer of an X2 type message.

11. A method comprising:
receiving data in at least one internet protocol message at a first base station from a second base station;
determining if said data is to be sent to a node associated with the first base station; and
sending the data in at least one link layer message to said node.

12. The method of claim 11, wherein said node is a relay node.

13. The method of claim 11, wherein the interface between the first base station and second base station is an X2 type interface or the said internet protocol message is an X2 type message, or both the interface between the first base station and second base station is an X2 type interface and the said internet protocol message is an X2 type message.

14. A computer program product, embodied on a non-transitory computer-readable medium in which a computer program is stored, when being executed by a computer, is configured to provide instructions to control or carry out the method of claim 1.

15. An apparatus, comprising:
at least one processor, and
at least one memory including computer program code,
wherein the at least one memory and the computer code are configured, with the at least one processor, to cause the apparatus to at least perform the following:
receiving, by a first access node, data in at least one link layer message from a second access node associated with said first access node;
determining if said data is to be sent to a third access node; and,
sending the data in at least one interne protocol message to the third access node.

16. The apparatus of claim 15 wherein said first access node is a base station or said second access node is a relay node, or both said first access node is a base station and said second access node is a relay node.

17. The apparatus of claim 15, wherein said first access node is part of the same sub-network as the second access node.

18. The apparatus of claim 15 wherein the interface between the first access node and third access node is an X2 type interface or the said internet protocol message is an X2 type message, or both the interface between the first access node and third access node is an X2 type interface and the said internet protocol message is an X2 type message.

19. The apparatus of claim 15 wherein said link layer is a Medium Access Control layer.

20. The apparatus of claim 15 wherein said link layer message includes routing information.

21. The apparatus of claim 20 wherein said routing information comprises one or more of global cell or node identity information.

22. The apparatus of claim 20 wherein said routing information includes parameters to enable flow separation in the user plane.

23. The apparatus of 20 wherein said routing information includes Tunnel End Point Identifier parameters.

24. The apparatus of claim 15 wherein the link layer message includes a modified X2-AP or Protocol Data Unit layer of an X2 type message.

25. An apparatus, comprising:
at least one processor, and
at least one memory including computer program code,
wherein the at least one memory and the computer code are configured, with the at least one processor, to cause the apparatus to at least perform the following:
receiving, by a first base station, data in at least one internet protocol message from a second base station;
determining if said data is to be sent to a node associated with the first base station; and
sending the data in at least one link layer message to said node.

26. The apparatus of claim 25, wherein said node is a relay node.

27. The apparatus of claim 25, wherein the interface between the first base station and second base station is an X2 type interface or the said internet protocol message is an X2 type message, or both the interface between the first base station and second base station is an X2 type interface and the said internet protocol message is an X2 type message.

28. The apparatus of claim 25, wherein said link layer is a Medium Access Control Layer or said link layer message includes routing information, or both said link layer is a Medium Access Control Layer and said link layer message includes routing information.

* * * * *

UNITED STATES PATENT AND TRADEMARK OFFICE
CERTIFICATE OF CORRECTION

| | | |
|---|---|---|
| PATENT NO. | : 8,743,760 B2 | Page 1 of 1 |
| APPLICATION NO. | : 13/381479 | |
| DATED | : June 3, 2014 | |
| INVENTOR(S) | : Hwang et al. | |

It is certified that error appears in the above-identified patent and that said Letters Patent is hereby corrected as shown below:

In the Claims

Claim 15, Column 10, line 6 delete "interne" and insert --internet--.

Signed and Sealed this
Twenty-sixth Day of August, 2014

Michelle K. Lee
*Deputy Director of the United States Patent and Trademark Office*